US011597828B2

(12) United States Patent
Na et al.

(10) Patent No.: US 11,597,828 B2
(45) Date of Patent: Mar. 7, 2023

(54) RUBBER COMPOSITION (71) Applicant: LG Chem, Ltd., Seoul (KR)

(72) Inventors: Youk Reol Na, Daejeon (KR); Jae Sun Choi, Daejeon (KR); No Ma Kim, Daejeon (KR); Jin Young Kim, Daejeon (KR); Yu Jin Kim, Daejeon (KR); Jae Moon Jun, Daejeon (KR)

(73) Assignee: LG Chem, Ltd.

( * ) Notice: Subject to any disclaimer, the term of this patent is extended or adjusted under 35 U.S.C. 154(b) by 454 days.

(21) Appl. No.: 16/628,472

(22) PCT Filed: Apr. 10, 2019

(86) PCT No.: PCT/KR2019/004286
§ 371 (c)(1),
(2) Date: Jan. 3, 2020

(87) PCT Pub. No.: WO2019/221391
PCT Pub. Date: Nov. 21, 2019

(65) Prior Publication Data
US 2020/0123365 A1    Apr. 23, 2020

(30) Foreign Application Priority Data

May 17, 2018 (KR) .......................... 10-2018-0056729

(51) Int. Cl.
| | |
|---|---|
| *B60C 1/00* | (2006.01) |
| *C08F 2/04* | (2006.01) |
| *C08F 4/48* | (2006.01) |
| *C08K 3/04* | (2006.01) |
| *C08K 3/36* | (2006.01) |
| *C08L 9/00* | (2006.01) |
| *C08L 9/06* | (2006.01) |
| *C08C 19/22* | (2006.01) |
| *C08C 19/25* | (2006.01) |
| *C08L 25/10* | (2006.01) |
| *C08K 3/013* | (2018.01) |
| *C08F 236/06* | (2006.01) |
| *C08F 236/08* | (2006.01) |
| *C08F 236/10* | (2006.01) |
| *C08K 5/00* | (2006.01) |
| *C08K 5/47* | (2006.01) |

(52) U.S. Cl.
CPC ............... *C08L 25/10* (2013.01); *B60C 1/00* (2013.01); *C08F 2/04* (2013.01); *C08F 236/06* (2013.01); *C08F 236/08* (2013.01); *C08F 236/10* (2013.01); *C08K 3/013* (2018.01); *C08K 3/04* (2013.01); *C08K 3/36* (2013.01); *C08K 5/0025* (2013.01); *C08K 5/47* (2013.01); *C08F 2810/40* (2013.01); *C08L 2205/025* (2013.01)

(58) Field of Classification Search
CPC .... C08L 9/06; C08L 9/08; C08L 25/10; C08L 9/00; C08L 9/10
See application file for complete search history.

(56) References Cited

U.S. PATENT DOCUMENTS

| | | | | |
|---|---|---|---|---|
| 4,677,165 | A | * | 6/1987 | Kikuchi .................... C08L 9/06 524/484 |
| 4,812,525 | A | * | 3/1989 | Oshima .................... C08L 9/00 525/333.2 |
| 5,910,544 | A | | 6/1999 | Ozawa et al. |
| 6,062,283 | A | | 5/2000 | Watanabe et al. |
| 6,133,388 | A | | 10/2000 | Lee et al. |
| 2006/0148964 | A1 | | 7/2006 | Lasage |
| 2011/0009509 | A1 | | 1/2011 | Dees et al. |
| 2011/0319519 | A1 | | 12/2011 | Sone et al. |
| 2013/0245198 | A1 | | 9/2013 | Mruk et al. |
| 2013/0331498 | A1 | | 12/2013 | Miyazaki |
| 2014/0135437 | A1 | | 5/2014 | Sandstrom et al. |
| 2016/0009846 | A1 | | 1/2016 | Sato et al. |
| 2016/0009907 | A1 | | 1/2016 | Naito et al. |
| 2016/0090475 | A1 | | 3/2016 | Nakatani |
| 2016/0222197 | A1 | | 8/2016 | Peters et al. |
| 2017/0313868 | A1 | | 11/2017 | Beelen et al. |
| 2018/0305470 | A1 | | 10/2018 | Lee et al. |
| 2020/0207957 | A1 | * | 7/2020 | Kanbara ............... B60C 1/0016 |

FOREIGN PATENT DOCUMENTS

| | | |
|---|---|---|
| CN | 101784595 A | 7/2010 |
| CN | 102101920 A | 6/2011 |
| CN | 103304864 A | 9/2013 |
| CN | 104086822 A | 10/2014 |
| CN | 105026482 A | 11/2015 |
| CN | 107001742 A | 8/2017 |
| CN | 107849160 A | 3/2018 |
| JP | 2005082659 A | 3/2005 |
| JP | 2012149239 A | 8/2012 |

(Continued)

OTHER PUBLICATIONS

Chinese Search Report for Application No. 201980003496.9 dated Jun. 21, 2021, pp. 1-3.
International Search Report for Application No. PCT/KR2019/004286 dated Jul. 12, 2019, 2 pages.
Chemical Retrieval on the Web (CROW), "Prediction of Solubility Parameters—A Comparison of Four Group Contribution Methods," Main Article and Appendix (Results), Internet Citation, Jan. 1, 2015, 19 pages, XP055687364.
Extended European Search Report with Written Opinion for Application No. 19803179.1 dated May 29, 2020, 8 pages.

(Continued)

*Primary Examiner* — Irina S Zemel
*Assistant Examiner* — Jeffrey S Lenihan
(74) *Attorney, Agent, or Firm* — Lerner, David, Littenberg, Krumholz & Mentlik, LLP (57) ABSTRACT The present invention relates to a rubber composition having excellent abrasion resistance and improved tensile properties and viscoelasticity properties by controlling compatibility among rubber components, and a tire manufactured using the same.

14 Claims, 2 Drawing Sheets

(56) References Cited

FOREIGN PATENT DOCUMENTS

| | | | |
|---|---|---|---|
| JP | 2013001795 A | 1/2013 |
| JP | 2013256585 A | 12/2013 |
| JP | 2016030799 A | 3/2016 |
| JP | 2016065175 A | 4/2016 |
| JP | 2016530380 A | 9/2016 |
| JP | 2017048336 A | 3/2017 |
| JP | 2017048339 A | 3/2017 |
| JP | 2017171707 A | 9/2017 |
| JP | 2017214493 A | 12/2017 |
| KR | 19990036051 A | 5/1999 |
| KR | 20000059341 A | 10/2000 |
| KR | 20110072403 A | 6/2011 |
| KR | 20110131217 A | 12/2011 |
| KR | 20150037853 A | 4/2015 |
| KR | 20150110668 A | 10/2015 |
| KR | 20170074679 A | 6/2017 |
| WO | WO2019044891 A1 * | 3/2019 |
| WO | 2019163773 A1 | 8/2019 |

OTHER PUBLICATIONS

Schuster, et al., "Selective Interactions in Elastomers, a Base for Compatibility and Polymer-Filler Interactions," Rubber Chemistry and Technology, Nov. 1, 1996, pp. 769-780, vol. 69, No. 5, American Chemical Society, Rubber Division, US, XP009501062.

* cited by examiner

FIG.1

FIG.2 though they further describe the technical spirit of the present invention together with the detailed description of the invention, the present invention should not be construed as limited to matters described in the drawings.

RUBBER COMPOSITION

CROSS-REFERENCE TO RELATED APPLICATIONS

The present application is a national phase entry under 35 U.S.C. § 371 of International Application No. PCT/KR2019/004286 filed Apr. 10, 2019, which claims priority from Korean Patent Application No. 10-2018-0056729 filed May 17, 2018, all of which are incorporated herein by reference.

TECHNICAL FIELD

The present invention relates to a rubber composition having excellent abrasion resistance and improved tensile properties and viscoelasticity properties by controlling compatibility among rubber components, and a tire manufactured using the same.

BACKGROUND ART

Recently, according to the demand for cars having a low fuel consumption ratio, the decrease of rolling resistance of tires is required, and tires having modulational stability represented by wet skid resistance as well as excellent abrasion resistance and tensile properties in respect of safety are required. Accordingly, a method for coexisting low rolling resistance and modulational stability by combining a filler such as silica with rubber components constituting a tire, particularly, a tire tread part, has been known.

For example, in order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may also be reduced by appropriately adjusting the glass transition temperature. The solution-polymerized SBR is prepared by using an anionic polymerization initiator and is being used by coupling or modifying the chain terminals of the polymer thus formed using various modifiers.

In addition, carbon black, silica, etc. are used as a reinforcing filler of a tire tread, and if the silica is used as the reinforcing filler, advantages of improving low hysteresis loss and wet skid resistance are achieved. However, silica at a hydrophilic surface has low affinity with a rubber component when compared with carbon black at a hydrophobic surface and agglomeration among silica is increased, and thus, a separate silane coupling agent is required to improve dispersibility or impart coupling between silica-rubber. Accordingly, a method of introducing a functional group having affinity or reactivity with silica at the terminal of a rubber molecule is conducted, but the effects thereof are insufficient.

DISCLOSURE OF THE INVENTION

Technical Problem

The present invention has been devised to solve the above-mentioned problems of the conventional technique, and an object is to provide a rubber composition having excellent abrasion resistance and improved tensile properties and viscoelasticity properties by controlling compatibility among rubber components.

In addition, another object of the present invention is to provide a tire manufactured using the rubber composition.

Technical Solution

To solve the above-mentioned tasks, the present invention provides a rubber composition including a first synthetic rubber; a second synthetic rubber; and a filler, wherein a solubility parameter difference between the first synthetic rubber and the second synthetic rubber is greater than 0.6, the first synthetic rubber is a solution-polymerized conjugated diene-based rubber which has a styrene bond content of 30 wt % or more, and the second synthetic rubber is a lithium-catalyzed modified butadiene-based rubber in which a functional group is bonded to at least one terminal.

In addition, there is provided in the present invention a tire manufactured using the rubber composition.

Advantageous Effects

The rubber composition according to the present invention includes heterogeneous rubber components of a first synthetic rubber and a second synthetic rubber, wherein the first synthetic rubber and the second synthetic rubber are selected and included so that a solubility parameter difference therebetween is greater than a specific range so as to control compatibility among rubbers, thereby achieving excellent abrasion resistance and improved tensile properties and viscoelasticity properties. In addition, the rubber composition includes a lithium-catalyzed modified butadiene rubber in which a functional group is bonded to at least one terminal as the second synthetic rubber, and may have even better affinity with a filler and further improved dispersibility of the filler in the rubber composition, thereby largely improving viscoelasticity properties.

BRIEF DESCRIPTION OF THE DRAWINGS

The following drawings attached to the specification illustrate preferred examples of the present invention.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "solubility parameter (δ)" used in the present invention represents a characteristic value of a material, which is the measure of mixing of materials, and was calculated by Mathematical Formula 1 below, which is a known solubility parameter calculation formula (RUBBER CHEMISTRY AND TECHNOLOGY: November 1996, Vol. 69, No. 5, pp 769-780).

$$\delta = 17.17 + 0.0272(\text{styrene wt \%}) - 0.0069(\text{vinyl wt \%})$$ [Mathematical Formula 1]

The present invention provides a rubber composition having excellent abrasion resistance and improved tensile properties and viscoelasticity properties.

The rubber composition according to an embodiment of the present invention is characterized in including a first synthetic rubber; a second synthetic rubber: and a filler, wherein a solubility parameter difference between the first synthetic rubber and the second synthetic rubber is greater than 0.6, the first synthetic rubber is a solution-polymerized conjugated diene-based rubber which has a styrene bond content of 30 wt % or more, and the second synthetic rubber is a lithium-catalyzed modified butadiene-based rubber in which a functional group is bonded to at least one terminal.

In addition, the rubber composition may include 30 parts by weight to 90 parts by weight of the first synthetic rubber; 10 parts by weight to 70 parts by weight of the second synthetic rubber; and 30 parts by weight to 200 parts by weight of the filler, based on 100 parts by weight of a rubber component including the first synthetic rubber and the second synthetic rubber.

In addition, the first synthetic rubber and the second synthetic rubber may have a solubility parameter difference of greater than 0.6 and less than or equal to 1.1, particularly, greater than 0.8 and less than or equal to 1.1, more particularly, greater than 0.82 and less than or equal to 1.07 or from 0.90 or more to 1.05 or less. If the solubility parameter difference between the first synthetic rubber and the second synthetic rubber is in the above-mentioned range, compatibility among rubber components may be controlled and the physical properties of the first synthetic rubber and the second synthetic rubber may be shown at the same time without deteriorating the physical properties of each, and thus, the tensile properties and viscoelasticity properties of the rubber composition including the synthetic rubbers may become excellent.

Particularly, if the solubility parameter difference is 0.6 or less, the phase separation between the first synthetic rubber and the second synthetic rubber may be restrained and wet skid resistance (braking performance) may be reduced. Meanwhile, if the solubility parameter difference is greater than 0.6, desired effects may be achieved, but for preferred effects, the difference may be greater than 0.6 and less than or equal to 1.1. If the solubility parameter difference is greater than 1.1, the phase separation between the first synthetic rubber and the second synthetic rubber may occur excessively, and the decrease of abrasion resistance (or tear performance) may rather occur.

The rubber composition according to an embodiment of the present invention includes heterogeneous rubber components of the first synthetic rubber and the second synthetic rubber, but the first synthetic rubber and the second synthetic rubber are selected so that solubility parameters between them are different by a specific range, and thus, compatibility among rubber components may be controlled, and physical properties of each of the first synthetic rubber and the second synthetic rubber may be shown at the same time. As a result, abrasion resistance may be excellent and tensile properties and viscoelasticity properties may be improved.

In addition, since the rubber composition according to an embodiment of the present invention includes a lithium-catalyzed modification butadiene rubber in which a functional group is bonded to at least one terminal as the second synthetic rubber, affinity with a filler may become more excellent, and thus, viscoelasticity properties may be further improved.

Hereinafter, each component included in the rubber composition according to an embodiment of the present invention will be explained in particular.

First Synthetic Rubber

In an embodiment of the present invention, the first synthetic rubber may be a solution-polymerized conjugated diene-based rubber which has the styrene bond content of 30 wt % or more.

Particularly, the first synthetic rubber may be a solution-polymerized conjugated diene-based rubber of high styrene series, which has the styrene bond content of 30 wt % or more and 55 wt % or less, more particularly, the first synthetic rubber may have the styrene bond content of 38 wt % or more and 55 wt % or less, or 38 wt % or more and 45 wt % or less. If the first synthetic rubber has the above-described styrene content, excellent effects of rolling resistance, wet skid resistance and low consumption ratio may be achieved.

In addition, the first synthetic rubber may be a solution-polymerized conjugated diene-based rubber including a repeating unit derived from a conjugated diene-based monomer and a repeating unit derived from an aromatic vinyl-based monomer, and in this case, the solution-polymerized conjugated diene-based rubber may include 60 wt % to 80 wt % of the repeating unit derived from a conjugated diene-based monomer and 20 wt % to 40 wt % of the repeating unit derived from an aromatic vinyl-based monomer.

In addition, in an embodiment of the present invention, the solution-polymerized conjugated diene-based rubber may include an extender oil, and in this case, the solution-polymerized conjugated diene-based rubber may include the extender oil in an amount of greater than 0 wt % and less than or equal to 37.5 wt %.

In addition, the solution-polymerized conjugated diene-based rubber may have the vinyl content of 10 wt % or more, 10 wt % to 40 wt %, or 20 wt % to 40 wt %, and within this range, the glass transition temperature may be controlled in an appropriate range and rolling resistance, wet skid resistance and a low fuel consumption ratio may be excellent. Here, the vinyl content may mean the amount of not 1,4-added but 1,2-added conjugated diene-based monomer with respect to 100 wt % of a conjugated diene-based rubber composed of a monomer having a vinyl group and an aromatic vinyl-based monomer.

In addition, the first synthetic rubber according to an embodiment of the present invention may be a modified conjugated diene-based rubber in which a functional group is bonded to at least one terminal, and in this case, the functional group may be any one or more selected among an amine group and an aminoalkoxysilane group. Particularly, the first synthetic rubber according to an embodiment of the present invention may be a solution-polymerized modified conjugated diene-based rubber in which a functional group is bonded to one terminal or both terminals. In case where the first synthetic rubber is a solution-polymerized modified conjugated diene-based rubber in which a functional group is bonded to one terminal, one or more among the amine group and the aminoalkoxysilane group may be bonded to one terminal, and in case where the first synthetic rubber is a solution-polymerized modified conjugated diene-based rubber in which functional groups are bonded to both terminals, the amine groups or the aminoalkoxysilane groups are bonded to both terminals, or the amine group is bonded to one terminal and the aminoalkoxysilane group is bonded to the other terminal.

In addition, the first synthetic rubber may have a number average molecular weight (Mn) of 20,000 g/mol to 800,000 g/mol, 100,000 g/mol to 550,000 g/mol, or 150,000 g/mol to 500,000 g/mol, and a weight average molecular weight (Mw) of 40,000 g/mol to 2,000,000 g/mol, 150,000 g/mol to 900,000 g/mol, or 200,000 g/mol to 800,000 g/mol. Within these ranges, rolling resistance and wet skid resistance are excellent. In another embodiment, the solution-polymerized conjugated diene-based rubber may have molecular weight distribution (Mw/Mn) of 1.0 to 4.0, 1.1 to 3.5, or 1.3 to 3.0, and within this range, balance among physical properties is excellent.

Here, the weight average molecular weight (Mw) and the number average molecular weight (Mn) are polystyrene converted molecular weights analyzed by gel permeation chromatography (GPC), respectively, and the molecular weight distribution (Mw/Mn) is also referred to as polydispersity and was calculated as a ratio (Mw/Mn) of the weight average molecular weight (Mw) and the number average molecular weight (Mn).

In another embodiment, the first synthetic rubber may have mooney viscosity of 40 to 120, or 50 to 100 at 100° C., and within this range, processability and productivity are excellent. In this case, the first synthetic rubber may not include an extender oil.

Here, the mooney viscosity was measured by using a mooney viscometer, for example, using a Large Rotor of MV2000E (ALPHA Technologies Co.) at a rotor speed of 2±0.02 rpm at 100° C. and 140° C. Particularly, a polymer was stood at room temperature (23±3° C.) for 30 minutes or more, and 27±3 g of the polymer was collected and put in a die cavity, and then, Platen was operated while applying torque and measurement was performed.

The term "derived repeating unit" used in the present invention may represent a component or a structure comes from a certain material, or the material itself. For example, the repeating unit derived from the conjugated diene-based monomer may mean a repeating unit formed by the conjugated diene-based monomer during polymerization, and the repeating unit derived from the aromatic vinyl monomer means a repeating unit formed by the aromatic vinyl monomer during polymerization.

Meanwhile, the first synthetic rubber according to an embodiment of the present invention may be prepared by polymerizing an aromatic vinyl-based monomer and a conjugated diene-based monomer in a hydrocarbon solvent including an organometal compound to prepare an active polymer combined with an organometal, and then reacting the active polymer thus prepared with a modifier, or by polymerizing an aromatic vinyl-based monomer and a conjugated diene-based monomer in a hydrocarbon solvent including a modification initiator to prepare an active polymer combined with a functional group derived from the modification initiator and an organometal, and then reacting the active polymer thus prepared with a modifier.

The hydrocarbon solvent is not specifically limited, but may be, for example, one or more selected from the group consisting of n-pentane, n-hexane, n-heptane, isooctane, cyclohexane, toluene, benzene and xylene.

The conjugated diene-based monomer is not specifically limited, but may be, for example, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, or 2,4-hexadiene, and may particularly be 1,3-butadiene.

The aromatic vinyl monomer is not specifically limited, but may be, for example, styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, or the like, and may particularly be styrene.

The modification initiator may be a compound prepared by reacting the organometal compound and an amine group-containing compound.

The organometal compound may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butyl phenyl lithium, 4-tolyllithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide and lithium isopropylamide.

The amine group-containing compound may be, for example, a compound represented by Formula 1 below.

[Formula 1]

In Formula 1,

$R_1$ to $R_3$ are each independently hydrogen; an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, $R_4$ is a single bond; a substituted or unsubstituted alkylene group of 1 to 20 carbon atoms with a substituent; a substituted or unsubstituted cycloalkylene group of 5 to 20 carbon atoms with a substituent; or a substituted or unsubstituted arylene group of 6 to 20 carbon atoms with a substituent, wherein the substituent is an alkyl group of 1 to 10 carbon atoms, a cycloalkyl group of 5 to 10 carbon atoms, or an aryl group of 6 to 20 carbon atoms, $R_5$ is an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; a heterocyclic group of 3 to 30 carbon atoms; or a functional group represented by Formula 1a or Formula 1b below, and n is an integer of 1 to 5, and at least one of $R_5$ groups is a functional group represented by Formula 1a or Formula 1b below, in case where n is an integer of 2 to 5, a plurality of $R_5$ groups may be the same or different,

[Formula 1a]

in Formula 1a, $R_6$ is a substituted or unsubstituted alkylene group of 1 to 20 carbon atoms with a substituent; a substituted or unsubstituted cycloalkylene group of 5 to 20 carbon atoms with a substituent; or a substituted or unsubstituted arylene group of 6 to 20 carbon atoms with a substituent, wherein the substituent is an alkyl group of 1 to 10 carbon atoms, a cycloalkyl group of 5 to 10 carbon atoms, or an aryl group of 6 to 20 carbon atoms, $R_7$ and $R_8$ are each independently a substituted or unsubstituted alkylene group of 1 to 20 carbon atoms with an alkyl group of 1 to 10 carbon atoms, a cycloalkyl group of 5 to 10 carbon atoms, or an aryl group of 6 to 20 carbon atoms, $R_9$ is hydrogen; an alkyl group of 1 to 30 carbon atoms, an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, and X is an N, O or S atom, in case where X is O or S, $R_9$ is not present,

[Formula 1b]

in Formula 1b,
$R_{10}$ is a substituted or unsubstituted alkylene group of 1 to 20 carbon atoms with a substituent; a substituted or unsubstituted cycloalkylene group of 5 to 20 carbon atoms with a substituent; or a substituted or unsubstituted arylene group of 6 to 20 carbon atoms with a substituent, wherein the substituent is an alkyl group of 1 to 10 carbon atoms, a cycloalkyl group of 5 to 10 carbon atoms, or an aryl group of 6 to 20 carbon atoms, and

$R_{11}$ and $R_{12}$ are each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms.

In addition, the modifier may be, for example, a compound represented by Formula 2 or Formula 3 below, or a combination thereof. That is, the compound represented by Formula 2 or the compound represented by Formula 3 may be used as the modifier, or the compound represented by Formula 2 and the compound represented by Formula 3 may be used at the same time.

[Formula 2]

In Formula 2, $A_1$ and $A_2$ are each independently an alkylene group of 1 to 20 carbon atoms, $R_{25}$ to $R_{28}$ are each independently an alkyl group of 1 to 20 carbon atoms, and $L_1$ and $L_2$, and $L_3$ and $L_4$ are connected with each other to form rings of 1 to 5 carbon atoms, respectively, where the rings formed by connecting $L_1$ and $L_2$, and $L_3$ and $L_4$ with each other include one to three heteroatoms selected from the group consisting of N, O and S.

[Formula 3]

In Formula 3, $R_{31}$ to $R_{33}$ are each independently an alkylene group of 1 to 10 carbon atoms, $R_{34}$ to $R_{37}$ are each independently an alkyl group of 1 to 10 carbon atoms, $R_{38}$ is hydrogen or an alkyl group of 1 to 10 carbon atoms, a and b are each independently an integer of 0 to 3, where a+b≥1, and A is where $R_{39}$ to $R_{42}$ are each independently hydrogen or an alkyl group of 1 to 10 carbon atoms.

Second Synthetic Rubber

In an embodiment of the present invention, the second synthetic rubber may be a lithium-catalyzed modified butadiene-based rubber in which a functional group is bonded to at least one terminal, as described above.

Particularly, the lithium-catalyzed modified butadiene-based rubber may have the vinyl bond content of 50 wt % or less, and more particularly, the vinyl content in a polymer may be 45 wt % or less. Here, the vinyl bond was measured by Fourier Transform Infrared Spectroscopy.

In addition, the lithium-catalyzed butadiene-based rubber may have a number average molecular weight (Mn) of 20,000 g/mol to 800,000 g/mol, 100,000 g/mol to 550,000 g/mol, or 150,000 g/mol to 500,000 g/mol, and a weight average molecular weight (Mw) of 40,000 g/mol to 2,000,000 g/mol, 150,000 g/mol to 900,000 g/mol, or 200,000 g/mol to 800,000 g/mol, and within these ranges, balance between physical properties may be excellent.

Here, the weight average molecular weight (Mw) and the number average molecular weight (Mn) were measured by the method described above.

Meanwhile, the lithium polymerized modified butadiene-based rubber according to an embodiment of the present invention may be prepared by polymerizing a conjugated diene-based monomer in the presence of a catalyst composition including a lithium-containing compound to prepare an active polymer and then reacting the active polymer thus prepared with a modifier. The lithium-catalyzed modified butadiene-based rubber thus prepared may easily introduce a functional group derived from a modifier, have narrow molecular weight distribution and as a result, have an excellent fuel consumption ratio.

Here, the conjugated diene-based monomer may be 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene or 2,4-hexadiene, particularly, 1,3-butadiene.

The catalyst composition may include a lithium-containing compound; an alkylating agent; and a halogen compound.

The lithium-containing compound is a compound activated by the alkylating agent to form a catalyst active species, for example, methyllithium, ethyllithium, propyllithium, n-butyllithium s-butyllithium, t-butyllithium, hexyllithium, n-decyllithium, t-octyllithium, phenyllithium, 1-naphthyl lithium, n-eicosyl lithium, 4-butyl phenyl lithium, 4-tolyllithium cyclohexyl lithium, 3,5-di-n-heptylcyclohexyl lithium, 4-cyclopentyl lithium, lithium alkoxide or lithium amide.

The alkylating agent is capable of delivering a hydrocarbyl group to another metal, and plays the role of a co-catalyst. For example, the alkylating agent may be one or more selected from the group consisting of an organoaluminum compound, an organomagnesium compound and an organolithium compound.

Particularly, the organoaluminum compound may include alkyl aluminums such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; dihydrocarbylaluminum hydrides such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydrides such as ethylaluminum dihydride, n-propylaluminum dihydride, isopropylaluminum dihydride, n-butylaluminum dihydride, isobutylaluminum dihydride, and n-octylaluminum dihydride, or the like. The organomagnesium compound may include alkylmagnesium compounds such as diethylmagnesium, di-n-propylmagnesium, diisopropylmagnesium, dibutylmagnesium, dihexylmagnesium, diphenylmagnesium and dibenzylmagnesium, and the organolithium compound may include alkyl lithium compounds such as n-butyllithium.

In addition, the organoaluminum compound may be aluminoxanes, for example, methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane.

Examples of the halide are not specifically limited, but the halide may be a diatomic halogen, an interhalogen compound, a hydrogen halide, an organic halide, a nonmetal halide, a metal halide, or an organometal halide, and any one of them or a mixture of two or more thereof may be used. Among them, considering the improvement of catalyst activity and consequent improving effect of reactivity, the halide may be any one selected from the group consisting of an organic halide, a metal halide and an organometal halide, or a mixture of two or more thereof.

The diatomic halogen may include fluorine, chlorine, bromine, or iodine.

Also, the interhalogen compound may include iodine monochloride, iodine monobromide, iodine trichloride, iodine pentafluoride, iodine monofluoride, iodine trifluoride, etc.

Also, the hydrogen halide may include hydrogen fluoride, hydrogen chloride, hydrogen bromide, or hydrogen iodide.

Also, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride (SiCl$_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphor triiodide, phosphor oxyiodide, selenium tetraiodide, or the like.

Also, the metal halide may include tin tetrachloride, tin tetrabromide, aluminum trichloride, aluminum tribromide, antimony trichloride, antimony pentachloride, antimony tribromide, aluminum tribromide, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

Also, the organometal halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

The modifier may be, for example, the above-described compound represented by Formula 2 or Formula 3, and one or a mixture of two or more materials may be used. That is, the modifier may be Formula 2, Formula 3 or a combination thereof.

Filler

In an embodiment of the present invention, the filler may be mixed with the rubber components to play the role of improving the physical properties of the rubber composition, and may particularly be silica.

For example, the silica may be wet silica (hydrated silicate), dry silica (anhydrous silicate), calcium silicate, aluminum silicate, or colloid silica. Preferably, the silica may be the wet silica which has the most significant improving effect of destruction characteristics and compatible effect of wet grip.

Meanwhile, the rubber composition according to an embodiment of the present invention may further include other rubber components, as necessary, in addition to the rubber components described above, and in this case, the other rubber components may be included in an amount of 90 wt % or less based on the total weight of the rubber composition.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, and a halogenated butyl rubber, and any one or a mixture two or more thereof may be used.

In addition, the rubber composition according to an embodiment of the present invention may be sulfur cross-linkable, and so may further include a vulcanizing agent.

The vulcanizing agent may particularly be a sulfur powder and may be included in an amount of 0.1 parts by weight to 10 parts by weight based on 100 parts by weight of a rubber component. With the amount used in the above range, elasticity and strength required for a vulcanized rubber composition may be secured, and at the same time, an excellent low fuel consumption ratio may be achieved.

In addition, if silica is used as the filler, a silane coupling agent may be used together in the rubber composition according to an embodiment of the present invention for the improvement of reinforcing and low exothermic properties. Particular examples of the silane coupling agent may include bis(3-triethoxysilylpropyl) tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used.

Preferably, bis(3-triethoxysilylpropyl)polysulfide or 3-trimethoxysilylpropylbenzothiazyltetrasulfide may be used in consideration of the improving effect of reinforcing properties.

The rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition, and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of a vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion resistance may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or a tire tread.

Hereinafter, the present invention will be explained in more detail referring to embodiments. However, the embodiments are for illustrating the present invention, and the scope of the present invention is not limited thereto.

In the Examples and Comparative Examples, parts by weight of other components excluding the rubber components are shown based on 100 parts by weight of the rubber components used in each of the Examples and Comparative Examples. Here, the rubber components represent only pure rubber obtained by excluding oil from each of styrene-butadiene rubber and butadiene rubber used in the Examples and Comparative Examples.

In addition, the same materials were used as the other components excluding the rubber components in the Examples and Comparative Examples. The coupling agent was bis(3-triethoxysilylpropyl)tetrasulfide (TESPT), the process oil was TDAE oil, and the vulcanization accelerator was N-cyclohexyl-2-benzothiazylsulfenamide (CZ) or diphenylguanidine (DPG).

EXAMPLE 1

63 parts by weight of a solution-polymerized both terminal-modified styrene-butadiene rubber (styrene content of 39 wt %, vinyl content of 25 wt %, extender oil content of 5 wt %) (MF3925, LG Chem,) (60 parts by weight of rubber component, 3 parts by weight of oil), 42 parts by weight of a one terminal-modified lithium-catalyzed butadiene rubber (vinyl content of 10 wt %, extender oil content of 5 wt %) (LG F0010, LG Chem,) (40 parts by weight of rubber component, 2 parts by weight of oil), 70 parts by weight of silica, 5.6 parts by weight of a coupling agent, 25.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta\delta$) between the solution-polymerized both terminal-modified styrene-butadiene rubber and the one terminal-modified lithium-catalyzed butadiene rubber was 0.96 (solubility parameter of solution-polymerized both terminal styrene-butadiene rubber=18.06, solubility parameter of one terminal-modified lithium-catalyzed butadiene rubber=17.10).

EXAMPLE 2

63 parts by weight of a solution-polymerized both terminal-modified styrene-butadiene rubber (styrene content of 43 wt %, vinyl content of 25 wt %, extender oil content of 5 wt %) (MF4325, LG Chem,) (60 parts by weight of rubber component, 3 parts by weight of oil), 42 parts by weight of a one terminal-modified lithium-catalyzed butadiene rubber (vinyl content of 10 wt %, extender oil content of 5 wt %) (LG F0010, LG Chem,) (40 parts by weight of rubber component, 2 parts by weight of oil), 70 parts by weight of silica, 5.6 parts by weight of a coupling agent, 25.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta\delta$) between the solution-polymerized both terminal-modified styrene-butadiene rubber and the one terminal-modified lithium-catalyzed butadiene rubber was 1.07 (solubility parameter of solution-polymerized both terminal styrene-butadiene rubber=18.17, solubility parameter of one terminal-modified lithium-catalyzed butadiene rubber=17.10).

EXAMPLE 3

78.8 parts by weight of a solution-polymerized both terminal-modified styrene-butadiene rubber (styrene content of 39 wt %, vinyl content of 25 wt %, extender oil content of 5 wt %) (MF3925, LG Chem,) (75 parts by weight of rubber component, 3.8 parts by weight of oil), 26.3 parts by weight of a one terminal-modified lithium-catalyzed butadiene rubber (vinyl content of 10 wt %, extender oil content of 5 wt %) (LG F0010, LG Chem,) (25 parts by weight of rubber component, 1.3 parts by weight of oil), 90 parts by weight of silica, 7.2 parts by weight of a coupling agent, 34.9 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta\delta$) between the solution-polymerized both terminal-modified styrene-butadiene rubber and the one terminal-modified lithium-catalyzed butadiene rubber was 0.96 (solubility parameter of solution-polymerized both terminal styrene-butadiene rubber=18.06, solubility parameter of one terminal-modified lithium-catalyzed butadiene rubber=17.10).

COMPARATIVE EXAMPLE 1

63 parts by weight of a solution-polymerized one terminal styrene-butadiene rubber (styrene content of 21 wt %, vinyl content of 50 wt %, extender oil content of 5 wt %) (F2150, LG Chem,) (60 parts by weight of rubber component, 3 parts by weight of oil), 40 parts by weight of an unmodified rare earth-catalyzed butadiene rubber (CB24, Lanxess), 70 parts by weight of silica, 5.6 parts by weight of a coupling agent, 27.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta\delta$) between the solution-polymerized one terminal styrene-butadiene rubber and the rare earth-catalyzed butadiene rubber was 0.23 (solubility parameter of solution-polymerized one terminal-modified styrene-butadiene rubber=17.40, solubility parameter of rare earth-catalyzed butadiene rubber=17.17).

COMPARATIVE EXAMPLE 2

63 parts by weight of a solution-polymerized both terminal-modified styrene-butadiene rubber (styrene content of 39 wt %, vinyl content of 25 wt %, extender oil content of 5 wt %) (MF3925, LG Chem,) (60 parts by weight of rubber component, 3 parts by weight of oil), 40 parts by weight of an unmodified rare earth-catalyzed butadiene rubber (CB24, Lanxess), 70 parts by weight of silica, 5.6 parts by weight of a coupling agent, 27.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta\delta$) between the solution-polymerized both terminal-modified styrene-butadiene rubber and the rare earth-catalyzed butadiene rubber was 0.89 (solubility parameter of solution-polymerized both terminal styrene-butadiene rubber=18.06, solubility parameter of unmodified rare earth-catalyzed butadiene rubber=17.17).

COMPARATIVE EXAMPLE 3

63 parts by weight of a solution-polymerized one terminal styrene-butadiene rubber (styrene content of 21 wt %, vinyl content of 50 wt %, extender oil content of 5 wt %) (F2150, LG Chem,) (60 parts by weight of rubber component, 3 parts by weight of oil), 42 parts by weight of a one terminal-modified lithium-catalyzed butadiene rubber (vinyl content of 10 wt %, extender oil content of 5 wt %) (LG F0010, LG Chem,) (40 parts by weight of rubber component, 2 parts by weight of oil), 70 parts by weight of silica, 5.6 parts by weight of a coupling agent, 25.0 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta\delta$) between the solution-polymerized both terminal-modified styrene-butadiene rubber and the rare earth-catalyzed butadiene rubber was 0.30 (solubility parameter of solution-polymerized one terminal styrene-butadiene rubber=17.40, solubility parameter of one terminal lithium-catalyzed butadiene rubber=17.10).

COMPARATIVE EXAMPLE 4

78.8 parts by weight of a solution-polymerized both terminal-modified styrene-butadiene rubber (styrene content of 39 wt %, vinyl content of 25 wt %, extender oil content of 5 wt %) (MF3925, LG Chem,) (75 parts by weight of rubber component, 3.8 parts by weight of oil), 25 parts by weight of an unmodified rare earth-catalyzed butadiene rubber (CB24, Lanxess), 90 parts by weight of silica, 7.2 parts by weight of a coupling agent, 36.2 parts by weight of a process oil, 3 parts by weight of zinc oxide, and 1 part by weight of stearic acid were mixed to prepare a first compounding product, and 1.5 parts by weight of a sulfur powder and 2.8 parts by weight of a vulcanization accelerator were mixed therewith to prepare a rubber composition. In this case, a solubility parameter difference ($\Delta\delta$) between the solution-polymerized both terminal-modified styrene-butadiene rubber and the rare earth-catalyzed butadiene rubber was 0.89 (solubility parameter of solution-polymerized both terminal styrene-butadiene rubber=18.06, solubility parameter of unmodified rare earth-catalyzed butadiene rubber=17.17).

EXPERIMENTAL EXAMPLES

In order to compare and analyze the physical properties of the rubber compositions prepared in the Examples and Comparative Examples, and molded products therefrom, tensile properties, abrasion resistance and viscoelasticity properties were measured, and the results are shown in Table 1 and Table 2 below. In addition, rubber components, other components, and the amounts thereof used for preparing the rubber compositions of the Examples and Comparative Examples are shown together in Table 1 and Table 2.

1) Tensile Properties

The tensile properties were measured by manufacturing each specimen and measuring tensile strength when broken and tensile stress when elongated by 300% (300% modulus) of each specimen according to an ASTM 412 tensile test method. Particularly, tensile properties were measured using a Universal Test Machin 4204 tensile tester (Instron Co.) in a rate of 50 cm/min at room temperature.

2) Abrasion Resistance

The abrasion resistance of the rubber specimen manufactured by the same method described in the tensile properties was measured using a DIN abrasion tester, where a worn loss weight was measured after applying a load of 10 N to a rotation drum to which an abrasion paper was attached, and moving the rubber specimen to a perpendicular direction of the rotational direction of the drum. The abrasion resistance was index based on the loss weight of Comparative Example 2. The rotation speed of the drum was 40 rpm, and a total moving distance of the specimen after finishing the test was 40 m. The greater the index value of the loss weight is, the better the abrasion resistance is.

3) Viscoelasticity Properties

The viscoelasticity properties were measured by measuring G" (dynamic loss modulus, E") and tan $\delta$ by changing deformation at each measurement temperature (−100° C.-80° C.) with a frequency of 10 Hz in a twist mode by using a dynamic mechanical analyzer (TA Co., ARES G2). If the index value of tan $\delta$ at a low temperature of 0° C.

increases, wet skid resistance (braking performance) becomes better, and if the index value of tan δ at a high temperature of 60° C. increases, hysteresis loss decreases, and low running resistance (fuel consumption ratio) becomes better.

Figure 1:
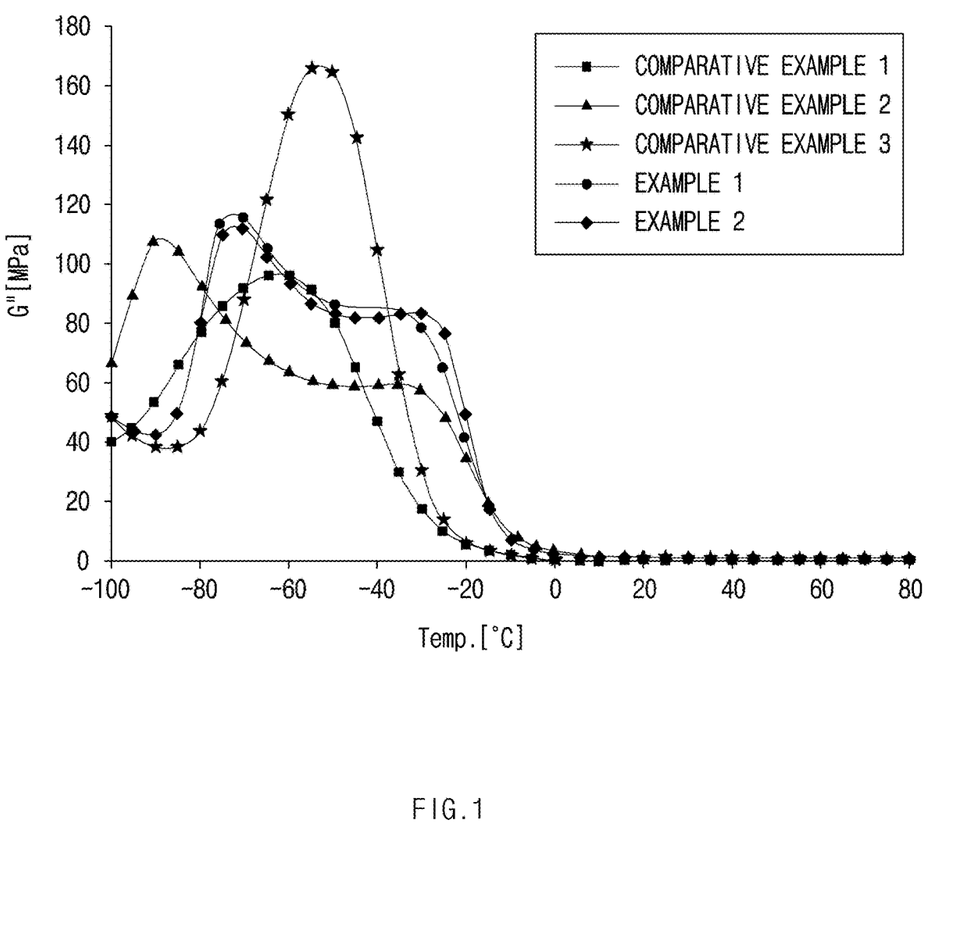
FIG. 1 shows a graph on G″ (dynamic loss modulus) change in accordance with the temperature of rubber compositions of Example 1 and Example 2 according to embodiments of the present invention, and Comparative Example 1 to Comparative Example 3.

In addition, by performing a temperature sweep test through the dynamic mechanical analyzer, G" change was measured, and through this, phase separation phenomenon due to compatibility difference among rubbers was secured. The results are shown in FIG. 1.

4) Transmission Electron Microscopy (TEM) Analysis

Each rubber composition was manufactured into a thin slice by microtoming and a TEM image was measured with the magnification of 20K-200K by using a Titan G2 80-200 Field emission transmission electron microscope equipment (TEI Co.).

Example 2, two glass transition temperatures may be shown due to the phase separation of two synthetic rubbers by controlling compatibility so that each of the rubber components in the rubber composition are not mixed to a completely homogeneous state by controlling solubility parameter difference between the two synthetic rubbers to a specific range. In case of Comparative Example 1 and Comparative Example 3, solubility parameter difference between two synthetic rubbers is small, and the rubber components in the rubber composition are mixed into a completely homogeneous state, and thus, one phase is obtained and one glass transition temperature is shown.

Through the results, in case of Example 1 and Example 2, effects shown by each synthetic rubber is maintained due to the phase separation of two synthetic rubbers by controlling compatibility so that the rubber components in the rubber

TABLE 1

| Division | | Comparative Example 1 | Comparative Example 2 | Comparative Example 3 | Example 1 | Example 2 |
|---|---|---|---|---|---|---|
| First synthetic rubber | F2150 | 63 | — | 63 | — | — |
| | MF3925 | — | 63 | — | 63 | — |
| | MF4325 | — | — | — | — | 63 |
| | F3925 | — | — | — | — | — |
| Second synthetic rubber | CB24 | 40 | 40 | — | — | — |
| | LG F0010 | — | — | 42 | 42 | 42 |
| Rubber component (parts by weight) | | 100 | 100 | 100 | 100 | 100 |
| Solubility parameter difference | | 0.23 | 0.89 | 0.30 | 0.96 | 1.07 |
| Silica | | 70 | 70 | 70 | 70 | 70 |
| Coupling agent | | 5.6 | 5.6 | 5.6 | 5.6 | 5.6 |
| Process oil | | 27 | 27 | 25 | 25 | 25 |
| Zinc oxide | | 3 | 3 | 3 | 3 | 3 |
| Stearic acid | | 1 | 1 | 1 | 1 | 1 |
| Sulfur powder | | 1.5 | 1.5 | 1.5 | 1.5 | 1.5 |
| Vulcanization accelerator | | 2.8 | 2.8 | 2.8 | 2.8 | 2.8 |
| Tensile propertyes | 300% modulus | 100 | 119 | 120 | 124 | 126 |
| | Elongation (%) | 100 | 107 | 93 | 97 | 95 |
| Abrasion resistance | | 100 | 101 | 113 | 101 | 100 |
| Viscoelasticity | Tan δ @ 0° C. | 100 | 171 | 90 | 170 | 173 |
| | Tan δ @ 60° C. | 100 | 102 | 112 | 125 | 122 |

In Table 1 above, the resultant values of the tensile properties, abrasion resistance and viscoelasticity for Example 1, Example 2, Comparative Example 2 and Comparative Example 3 were indexed based on the measurement values of Comparative Example 1 and shown. As shown in Table 1 above, it was found that the tensile properties and viscoelasticity properties were largely improved and the abrasion resistance was similar degree for Example 1 and Example 2 according to embodiments of the present invention when compared with Comparative Example 1 to Comparative Example 3.

Particularly, Example 1 and Example 2 showed largely improved tensile properties and viscoelasticity properties while having excellent abrasion resistance, but Comparative Example 1 and Comparative Example 3, which included heterogeneous synthetic rubbers having a solubility parameter difference between two synthetic rubbers of 0.6 or less, showed markedly decreased tensile properties and viscoelasticity properties when compared with Example 1 and Example 2.

In addition, as shown in FIG. 1, it may be found that Example 1 and Example 2 have two inflection points but Comparative Example 1 and Comparative Example 3 have one inflection point. Here, the inflection point is generally considered as the glass transition temperature, and thus, two inflection points represent the presence of two glass transition temperatures. That is, in case of Example 1 and composition are not mixed to a completely homogeneous state by controlling solubility parameter difference between the two synthetic rubbers to a specific range or more, but in case of Comparative Example 1 and Comparative Example 3, solubility parameter difference between two synthetic rubbers is small, and the rubber components in the rubber composition are mixed into a completely homogeneous state, and thus, effects shown by each synthetic rubber is not maintained.

Figure 2:
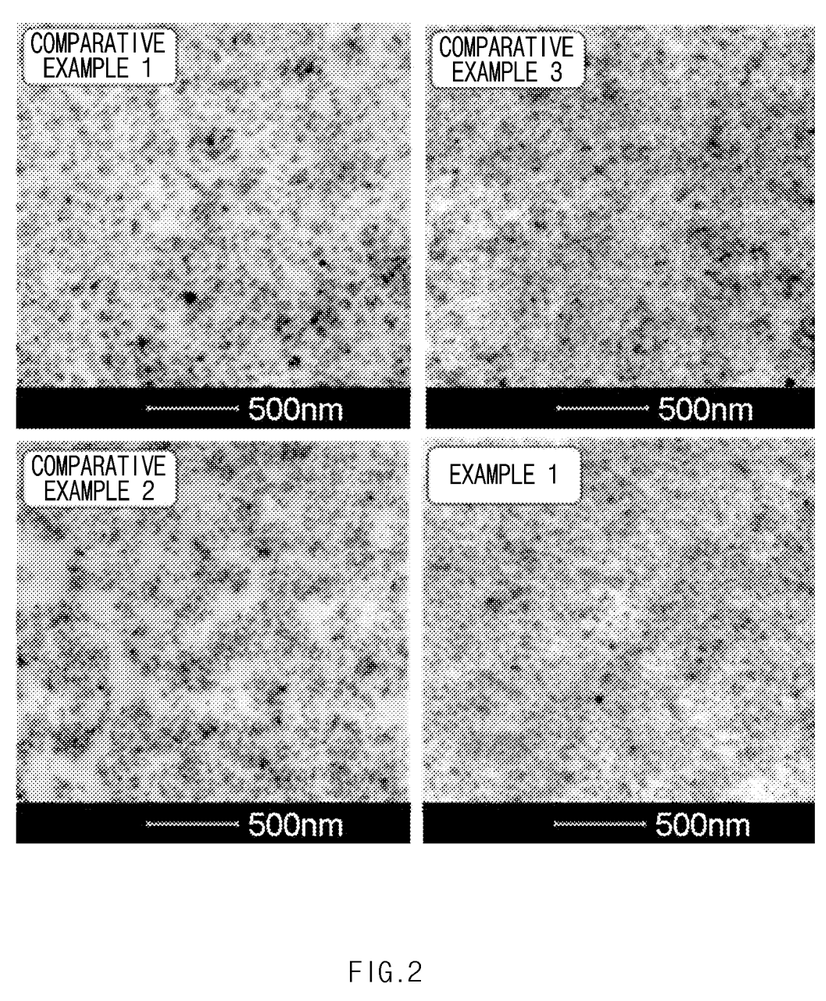
FIG. 2 shows TEM images (magnification 28K (28,000)) on rubber compositions of Example 1 according to an embodiment of the present invention, and Comparative Example 1 to Comparative Example 3.

In addition, it may be confirmed through the TEM images of FIG. 2 that Example 1 showed markedly better dispersibility of a filler in a rubber composition when compared with Comparative Example 1 and Comparative Example 2. As shown in TEM images of Comparative Example 1 and Comparative Example 2, common butadiene rubber had low affinity with silica and had problems of nonuniform distribution of silica around the butadiene rubber. However, in Example 1 of the present application, silica was uniformly distributed in the whole rubber composition, and through this, the rubber composition of the present invention could be confirmed to show excellent affinity with silica by including a lithium-catalyzed modified butadiene rubber in which a functional group was bonded to at least one terminal, as the second synthetic rubber. In addition, consequently, the rubber composition of the present invention had even better affinity, and thus, viscoelasticity properties could be even further improved.

Meanwhile, in case of Comparative Example 2, two synthetic rubbers were included but the solubility parameter difference was controlled in the range suggested in the present invention, and thus, it was found that abrasion resistance and tensile properties showed similar degrees but viscoelasticity properties were markedly decreased when compared with Example 1.

TABLE 2

| Division | | Comparative Example 4 | Example 3 |
|---|---|---|---|
| First synthetic rubber | MF3925 | 78.8 | 78.8 |
| Second synthetic rubber | CB24 | 25 | — |
| | LG F0010 | — | 26.3 |
| Rubber component (parts by weight) | | 100 | 100 |
| Solubility parameter difference | | 0.89 | 0.96 |
| Silica | | 90 | 90 |
| Coupling agent | | 7.2 | 7.2 |
| Process oil | | 36.2 | 34.9 |
| Zinc oxide | | 3 | 3 |
| Stearic acid | | 1 | 1 |
| Sulfu powder | | 1.5 | 1.5 |
| Vulcanization accelerator | | 2.8 | 2.8 |
| Tensile properties | 300% modulus | 100 | 106 |
| | Elongation (%) | 100 | 93 |
| Abrasion resistance | | 100 | 101 |
| viscoelasticity | Tan δ @ 0° C. | 100 | 96 |
| | Tan δ @ 60° C. | 100 | 120 |

In Table 2 above, the resultant values on the tensile properties, abrasion resistance and viscoelasticity of Example 3 were indexed based on the measured values of Comparative Example 4 and shown.

As shown in Table 2 above, it was found that Example 3 according to an embodiment of the present invention showed excellent abrasion resistance and tensile properties of similar degrees and largely improved viscoelasticity properties when compared with Comparative Example 4. In this case, in Example 3 and Comparative Example 4, the ratios of the first synthetic rubber and silica were increased and the ratio of the second synthetic rubber was decreased when compared with Example 1 and Comparative Example 2, respectively. It may be found that even though the ratios in the rubber composition were changed, Example 3 according to an embodiment of the present invention showed largely improved viscoelasticity properties while maintaining excellent tensile properties and abrasion resistance.

The invention claimed is:

1. A rubber composition comprising:
a first synthetic rubber;
a second synthetic rubber: and
a filler,
wherein a solubility parameter difference between the first synthetic rubber and the second synthetic rubber is greater than 0.8 and less than or equal to 1.1,
the first synthetic rubber is a solution-polymerized modified conjugated diene-based rubber which has a styrene bond content of 38 wt % or more, and 55 wt % or less, and has a first functional group bonded to at both terminals, and
the second synthetic rubber is a lithium-catalyzed modified butadiene-based rubber in which a second functional group is bonded to at least one terminal.

2. The rubber composition according to claim 1, wherein the second synthetic rubber has a vinyl bond content in a polymer of 50 wt % or less.

3. The rubber composition according to claim 1, wherein the rubber composition comprises 30 parts by weight to 90 parts by weight of the first synthetic rubber; 10 parts by weight to 70 parts by weight of the second synthetic rubber; and 30 parts by weight to 200 parts by weight of the filler, based on 100 parts by weight of a rubber component comprising the first synthetic rubber and the second synthetic rubber.

4. The rubber composition according to claim 1, wherein the filler is silica or carbon black.

5. The rubber composition according to claim 1, wherein the rubber composition further comprises a vulcanizing agent.

6. The rubber composition according to claim 1, wherein the rubber composition further comprises one or more additives selected from a vulcanization accelerator, a process oil or an antiaging agent.

7. A tire comprising the rubber composition according to claim 1.

8. The rubber composition according to claim 1, wherein the first synthetic rubber comprises 60 wt % to 80 wt % of a repeating unit derived from a conjugated diene-based monomer and 20 wt % to 40 wt % of a repeating unit derived from an aromatic vinyl-based monomer.

9. The rubber composition according to claim 1, wherein the first synthetic rubber comprises an extender oil in an amount of greater than 0 wt % and less than or equal to 37.5 wt %.

10. The rubber composition according to claim 1, wherein the first functional group in the first synthetic rubber is an amine group, an aminoalkoxysilane group, or a combination thereof.

11. The rubber composition according to claim 1, wherein the first synthetic rubber comprises a repeating unit derived from a conjugated diene-based monomer selected from 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, or 2,4-hexadiene.

12. The rubber composition according to claim 1, wherein the first synthetic rubber comprises a repeating unit derived from an aromatic vinyl monomer selected from styrene, α-methylstyrene, 3-methylstyrene, 4-methylstyrene, 4-propylstyrene, 1-vinylnaphthalene, 4-cyclohexylstyrene, 4-(p-methylphenyl)styrene, or 1-vinyl-5-hexylnaphthalene.

13. The rubber composition according to claim 1, wherein the first synthetic rubber has a number average molecular weight (Mn) of 20,000 g/mol to 800,000 g/mol, a weight average molecular weight (Mw) of 40,000 g/mol to 2,000,000 g/mol, and molecular weight distribution (Mw/Mn) of 1.0 to 4.0.

14. The rubber composition according to claim 1, wherein the second synthetic rubber has a number average molecular weight (Mn) of 20,000 g/mol to 800,000 g/mol, and a weight average molecular weight (Mw) of 40,000 g/mol to 2,000,000 g/mol.

* * * * *